(12) United States Patent
Wright et al.

(10) Patent No.: US 12,058,008 B2
(45) Date of Patent: *Aug. 6, 2024

(54) AUTOMATIC NETWORK DEVICE IDENTIFICATION AND PRESENTATION OF NETWORK INFORMATION VIA AUGMENTED REALITY

(71) Applicant: Charter Communications Operating, LLC, St. Louis, MO (US)

(72) Inventors: Ethan Wright, Denver, CO (US); Omar Alami, Denver, CO (US)

(73) Assignee: Charter Communications Operating, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,508

(22) Filed: Jan. 24, 2023

(65) Prior Publication Data

US 2023/0164036 A1 May 25, 2023

Related U.S. Application Data

(63) Continuation of application No. 17/357,260, filed on Jun. 24, 2021, now Pat. No. 11,575,584.

(51) Int. Cl.
*H04L 41/16* (2022.01)
*G06V 20/20* (2022.01)
*H04L 41/0896* (2022.01)
*H04L 41/12* (2022.01)
*H04L 41/22* (2022.01)

(52) U.S. Cl.
CPC ............. *H04L 41/16* (2013.01); *G06V 20/20* (2022.01); *H04L 41/0896* (2013.01); *H04L 41/12* (2013.01); *H04L 41/22* (2013.01)

(58) Field of Classification Search
CPC ..... H04L 41/16; H04L 41/0896; H04L 41/12; H04L 41/22; G06V 20/20
See application file for complete search history.

(56) References Cited

U.S. PATENT DOCUMENTS 11,341,367 B1* 5/2022 Barbosa .............. G06F 18/2148
2019/0372861 A1* 12/2019 Roy ........................ H04L 41/22
2020/0296186 A1* 9/2020 Lau ....................... H04L 43/065

OTHER PUBLICATIONS

Author Unknown, "CUJO AI Explorer: Securing and Enhancing Connected Experiences Through Access to Data" CUJO LLC, White Paper, 2020, 19 pages.
Office Action for U.S. Appl. No. 17/357,260, mailed Oct. 14, 2021, 13 pages.
Final Office Action for U.S. Appl. No. 17/357,260, mailed May 31, 2022, 13 pages.

(Continued)

*Primary Examiner* — Adnan M Mirza
(74) *Attorney, Agent, or Firm* — Dority & Manning, P.A.

(57) ABSTRACT

Automatic network device identification and presentation of network information via augmented reality is disclosed. Real time imagery of a scene within a field of view of a camera is received. It is determined that the imagery depicts a first object. It is determined that the first object comprises a first network-attached device attached to a network. Information that corresponds to the first network-attached device is obtained, and the information is presented in conjunction with a real time view of the scene.

20 Claims, 6 Drawing Sheets

(56) References Cited

OTHER PUBLICATIONS

Applicant-Initiated Interview Summary for U.S. Appl. No. 17/357,260, mailed Jan. 18, 2022, 2 pages.
Advisory Action for U.S. Appl. No. 17/357,260, mailed Aug. 17, 2022, 2 pages.
Notice of Allowance and Notice of Allowability for U.S. Appl. No. 17/357,260, mailed Oct. 6, 2022, 5 pages.

* cited by examiner

AUTOMATIC NETWORK DEVICE IDENTIFICATION AND PRESENTATION OF NETWORK INFORMATION VIA AUGMENTED REALITY

RELATED APPLICATION

This application is a continuation of co-pending U.S. patent application Ser. No. 17/357,260, filed on Jun. 24, 2021, entitled "AUTOMATIC NETWORK DEVICE IDENTIFICATION AND PRESENTATION OF NETWORK INFORMATION VIA AUGMENTED REALITY," which is hereby incorporated herein by reference in its entirety.

BACKGROUND

Accessing network information associated with a network-attached device or modifying network-related characteristics of a network-attached device can require a relatively high level of technical expertise.

SUMMARY

The embodiments disclosed herein implement automatic network device identification and presentation of network information via augmented reality.

In one embodiment a method is provided. The method includes receiving, by a computing device comprising a processor device, real time imagery of a scene within a field of view of a camera. The method further includes determining, by the computing device, that the imagery depicts a first object. The method further includes determining, by the computing device, that the first object comprises a first network-attached device attached to a network. The method further includes obtaining, by the computing device, information that corresponds to the first network-attached device. The method further includes presenting, by the computing device on a display device, the information in conjunction with a real time view of the scene.

In another embodiment a computing device is provided. The computing device includes a memory and a processor device coupled to the memory. The processor device is configured to receive real time imagery of a scene within a field of view of a camera. The processor device is further configured to determine that the imagery depicts a first object. The processor device is further configured to determine that the first object comprises a first network-attached device attached to a network. The processor device is further configured to obtain information that corresponds to the first network-attached device. The processor device is further configured to present, on a display device, the information in conjunction with a real time view of the scene.

In another embodiment a non-transitory computer-readable storage medium is provided. The non-transitory computer-readable storage medium includes executable instructions configured to cause a processor device to receive real time imagery of a scene within a field of view of a camera. The executable instructions are further configured to cause the processor device to determine that the imagery depicts a first object. The executable instructions are further configured to cause the processor device to determine that the first object comprises a first network-attached device attached to a network. The executable instructions are further configured to cause the processor device to obtain information that corresponds to the first network-attached device. The executable instructions are further configured to cause the processor device to present, on a display device, the information in conjunction with a real time view of the scene.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
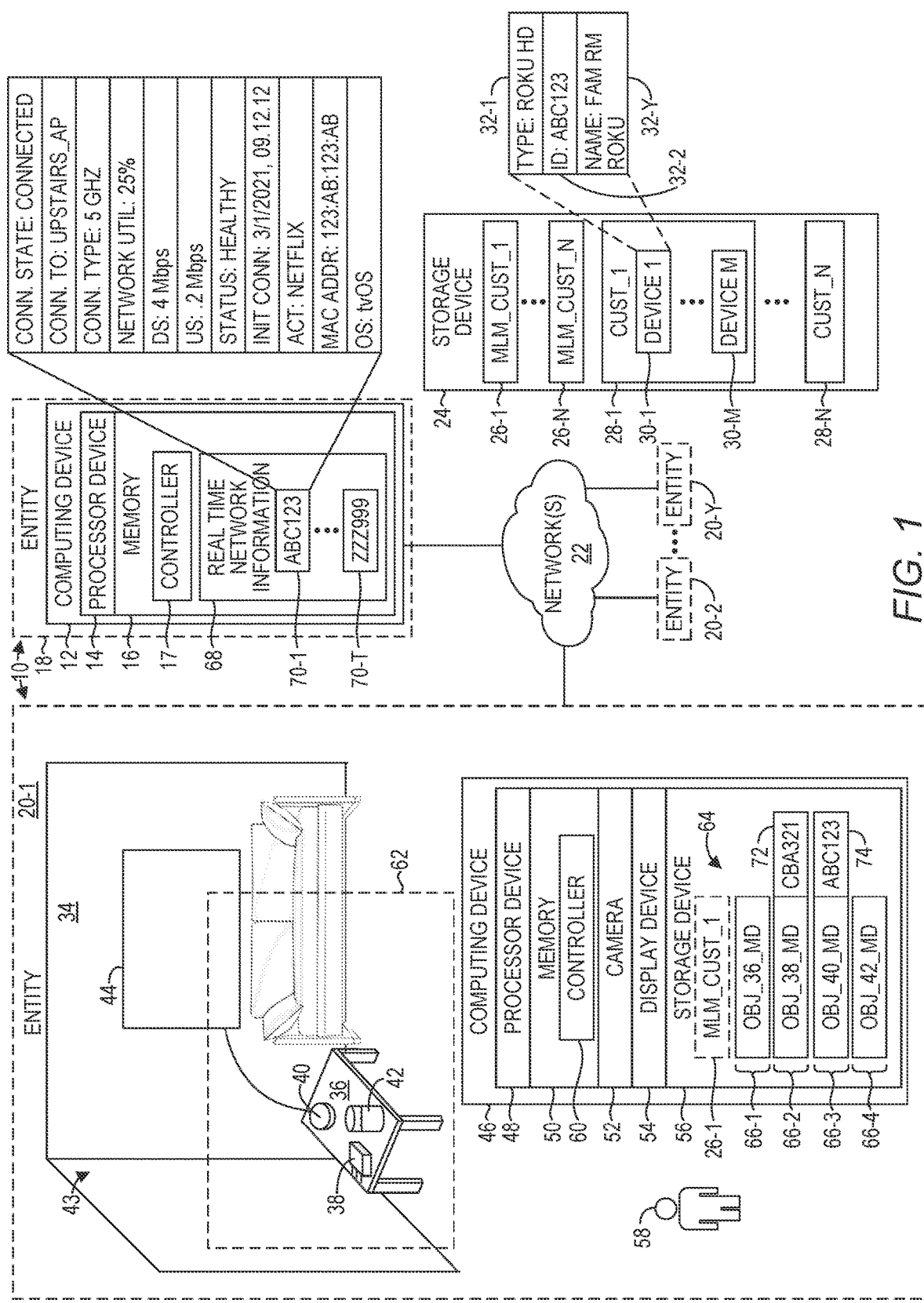
FIG. 1 is a block diagram of an environment in which automatic network device identification and presentation of network information via augmented reality can be practiced according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Accessing network information associated with a network-attached device or modifying network-related characteristics of a network-attached device can require a relatively high level of technical expertise. In many environments, including residential environments, to obtain information about a network-attached device or modify a network-related characteristic of a network-attached device, it is necessary to utilize a proprietary application, or navigate to a particular web page, where an individual is often presented with technical content regarding all of the network-attached devices in a manner that is not readily understood by a non-technical individual. Often, especially in environments where individuals routinely use mobile devices such as smartphones, computing tablets, laptop computing devices, and the like, an individual may be presented with a list of 15-20 devices and a person without the requisite expertise may have a problem even knowing which listed device corresponds to the network-attached device of interest.

The complexity associated with accessing network information associated with a network-attached device or modifying network-related characteristics of a network-attached device can lead to a number of problems, including an inability to diagnose a problem with a network-attached device. This can lead not only to frustration, but to unnecessary calls to an entity for support. For example, a service provider that provides broadband communications to an entity may receive calls from a frustrated consumer for an issue that could have been resolved by the consumer if the consumer had been able to access the network information associated with a network-attached device or modify the network-related characteristics of the network-attached device. Such support calls increase costs for the service provider.

The embodiments disclosed herein implement automatic network device identification and presentation of network information via augmented reality. An individual utilizes a computing device with a camera and a display device, such as a smart phone, computing tablet, head-mounted augmented reality (AR) device, or the like, to view a scene that depicts a device. The computing device determines that the device is a network-attached device. The computing device receives information that corresponds to the network-attached device, and presents the information on the display device in conjunction with the scene that depicts the device. Among other advantages, the embodiments eliminate the need for an individual to have the relatively substantial technical skills that may otherwise be needed to obtain the information about the network-attached device, and also provide such information substantially faster than would otherwise be possible, in an intuitive manner.

FIG. 1 is a block diagram of an environment 10 in which automatic network device identification and presentation of network information via augmented reality can be practiced according to one embodiment. The environment 10 includes one or more computing devices 12 that include one or more processor devices 14 and a memory 16. The memory 16 may include a controller 17 that implements some of the functionality described herein. Because the controller 17 is a component of the computing device 12, functionality implemented by the controller 17 may be attributed herein to the computing device 12 or the processor device 14. In some embodiments, the computing device 12 may be associated with, such as owned, operated, or used by, an entity 18, such as a service provider or other business. For purposes of illustration and simplicity, functionality will be attributed herein to the computing device 12; however, in practice, the functionality attributed herein to the computing device 12 may be implemented by any number of computing devices associated with the entity 18. Such computing devices may be geographically close to one another, geographically distant from one another, or a combination thereof.

The computing device 12 may be communicatively coupled to one or more entities 20-1-20-Y (generally, entities 20), such as residences, businesses, or the like, via one or more networks 22. Each entity 20 may include one or more computing devices that have been provided and/or provisioned by the entity 18 and programmed or otherwise configured to communicate with the computing device 12 via the network 22. Such computing devices may include, by way of non-limiting example, cable modems, wireless gateways, or the like.

The computing device 12 includes, or is communicatively coupled to, one or more storage devices 24. The storage device 24 includes a plurality of machine learning models (MLMs) 26-1-26-N (generally, MLMs 26), each of which may be associated with a network of an entity 20, such as a customer, that obtains services from the entity 18. As will be described in greater detail herein, each MLM 26 has been trained to, upon receipt of an image of an object, output information that identifies whether the object is a device that is attached to a network of the entity 20.

The storage device 24 also includes customer information 28-1-28-N (generally, customer information 28). Each customer information 28 contains information about the devices on the network of an entity 20. For example, the customer information 28-1 includes a plurality of device records 30-1-30-M (generally, device records 30), each of which corresponds to a network-attached device connected to a network of the entity 20-1. Each device record 30 contains one or more fields 32-1-32-Y of information about a corresponding network-attached device, including, by way of non-limiting example, a field 32-1 that identifies the type of network-attached device, a field 32-2 that identifies a unique identifier associated with the network-attached device, and a field 32-Y that contains a user-provided name, sometimes referred to as a nickname, associated with the network-attached device.

In this example, the entity 20-1 is a home of a residential customer of the entity 18. The entity 20-1 includes a room 34 that includes an object 36, a table, on which three other objects 38, 40 and 42 rest. The object 38 is a network-attached device that is communicatively coupled to the computing device 12 via one or more intermediary devices, such as, by way of non-limiting example, a cable modem (not illustrated), a cable modem termination system (CMTS) not illustrated, and any number of other intermediary devices.

In this example, the object 38 is a wireless gateway that was provisioned and provided by the entity 18 to provide broadband communications to the entity 20-1. The object 38 implements a wired and wireless network 43 in the entity 20-1. The object 40 is also a network-attached device that is attached to the network 43. Specifically, the object 40 is a media streaming device, in particular a Roku® network-attached device that is cable-connected to a television 44 and wirelessly coupled to the object 38. The object 40, upon request, receives media streams and presents the media streams on the television 44. The object 42 is a glass containing a beverage.

The entity 20-1 includes a computing device 46 that includes a processor device 48, a memory 50, a camera 52, a display device 54, and a storage device 56. The computing device 46 may also be a network-attached device that is attached to the network 43. The computing device 46 may comprise any device capable of implementing augmented reality comprising a real-time view of a scene upon which imagery is overlayed. By way of non-limiting example, the computing device 46 may comprise a special purpose device configured to provide the functionality described herein, a smart phone, a computing tablet, a laptop computer, a head-mounted optical see-through AR device, a head-mounted video see-through AR device, or the like. In embodiments where the computing device 46 comprises an optical see-through AR device, the display device 54 may comprise a partially transmissive and partially reflective lens or mirror. In other embodiments, the display device 54 may comprise a display panel, such as an LCD display panel, an OLED display panel, or the like. In some embodiments, the computing device 46 may lack the storage device 56.

A user 58 holds or wears the computing device 46. The computing device 46 includes a controller 60, which, in some embodiments, may be an application initiated by the user 58. The controller 60 causes the camera 52 to capture real time imagery of a scene 62 that is within a field of view (FOV) of the camera 52. The scene 62 may be concurrently presented in real time on the display device 54 where the computing device 46 is not an optical see-through device.

The controller 60 includes device detection augmented reality technology, such as, by way of non-limiting example, Apple® ARKit®, Vuforia®, Sudan®, or the like. The controller 60 detects the four objects 36-42 in the scene 62. The controller 60 may generate and store AR metadata 64 for the objects 36-42. The AR metadata 64 may include a plurality of AR metadata records 66-1-66-4 (generally, AR metadata records 66), each of which corresponds to one of the objects 38-44. The AR metadata records 66 may include a unique AR ID assigned to the corresponding object to, among other things, facilitate visually anchoring AR imagery to the corresponding object in the display device 54.

In one embodiment, the controller 60 may iteratively, for each object 36-42, generate an image of the object from the real time imagery received by the camera 52, and cause the image to be presented to the MLM 26-1 to determine whether each object 36-42 is or is not a network-attached device.

As an example, the controller 60 may initially generate an image of the object 36 (table) from the real-time imagery of the scene 62 received by the camera 52, and send the image to the computing device 12. The computing device 12 presents the image to the MLM 26-1. The MLM 26-1 outputs information that indicates the object 36 depicted in the image is not a network-attached device. The computing device 12 sends a message to the computing device 46 that the object 36 is not a network-attached device.

The controller 60 generates an image of the object 38 (wireless gateway) from the real-time imagery of the scene 62 received by the camera 52, and sends the image to the computing device 12. The computing device 12 presents the image to the MLM 26-1. The MLM 26-1 outputs information that identifies the object 38 depicted in the image as a network-attached device, and returns the unique ID that corresponds to the object 38.

In some embodiments, the computing device 12 may then automatically utilize the unique ID to obtain information about the object 38 (wireless gateway). In particular, the computing device 12 may access a device record 30 of the customer information 28-1 that corresponds to the unique ID and retrieve the information from the fields 32-1-32-Y.

In some embodiments, the computing device 12 continuously maintains real time network information 68 about network-attached devices. In one embodiment, the computing device 12 maintains a plurality of network information records 70-1-70-T, each of which corresponds to a network-attached device associated with an entity 20. The particular information maintained may differ depending on the type of device of the network-attached device. For example, for a wireless gateway, the computing device 12 may keep track of a current downstream utilization, a current upstream utilization, a total downstream utilization over a predetermined period of time, such as 24 hours, a week or the like, a total downstream utilization over the predetermined period of time, a connection state, a status, a media access control (MAC) address, a firmware version, an operating system and operating system version, a number of attached devices, names of the attached devices, and the like.

After receiving the unique ID from the MLM 26-1, the computing device 12 may automatically obtain the network information record 70 that corresponds to the object 38 (wireless gateway), and provide the unique ID of the object 38 and the information about the object 38 to the computing device 46. In other embodiments, the computing device 12 may initially only send the unique ID of the object 38 to the computing device 46 so that the computing device 46 determines that the object 38 is a network-attached device, and if desired, the computing device 46 may subsequently request the information about the object 38.

Assume that the computing device 46 initially receives only a unique ID 72 that corresponds to the object 38. The computing device 46 may store the unique ID 72 in conjunction with the AR metadata record 66-2 that corresponds to the object 38.

The controller 60 generates an image of the object 40 (media streaming device) from the real-time imagery of the scene 62 received by the camera 52, and sends the image to the computing device 12. The computing device 12 presents the image to the MLM 26-1. The MLM 26-1 outputs information that indicates that the object 40 depicted in the image is a network-attached device, and returns the unique ID that corresponds to the object 40.

The computing device 12 sends a unique ID 74 of the object 40 to the computing device 46. Based on the receipt of the unique ID 74, the controller 60 determines that the object 40 is a network-attached device. The controller 60 stores the unique ID 74 in conjunction with the AR metadata record 66-3 that corresponds to the object 40.

If the entity 20-1 had multiple Roku® media streaming devices, the MLM 26-1 may return multiple unique IDs. The computing device 12 may then access the device records 30 that correspond to each of the Roku® media streaming devices and obtain information that distinguishes such devices, such as the user-provided name provided to each device, the MAC addresses, or some other distinguishing characteristic. The computing device 12 sends the user-provided names to the controller 60 with information indicating that the imagery depicts an object of which multiple instances are connected to the network 43. The controller 60 presents the information on the display device 54 requesting that the user 58 identify the particular device, via the user provided name, to which the object 40 corresponds. Upon receipt of the selection from the user 58, the controller 60 sends information that identifies the particular device to which the object 40 corresponds. The computing device 12 then sends to the controller 60 the unique ID associated with the selected device.

The controller 60 next generates an image of the object 42 (glass) from the real-time imagery of the scene 62 received by the camera 52, and sends the image to the computing device 12. The computing device 12 presents the image to the MLM 26-1. The MLM 26-1 outputs information that indicates that the object 42 depicted in the image is not a network-attached device. The computing device 12 sends a message to the computing device 46 that the object 36 is not a network-attached device. Based on the message received from the computing device 12, the controller 60 determines that the object 42 is not a network-attached device.

On subsequent initiations of the controller 60, assuming that the objects 38 and 40 have not moved, the controller 60 can determine that the objects 38 and 40 have previously been identified as network-attached devices, and need not repeat the process to determine whether the objects 38 and 40 are network-attached devices. The controller 60 need only access the unique IDs 72 and 74 to obtain the current information from the computing device 12 for the objects 38 and 40.

In one embodiment, if there is more than one network-attached device in a scene, the controller 60 may generate AR imagery that comprises selection controls, and overlay the real time video stream that is being generated by the camera 52 and presented on the display device 54 with the AR imagery such that the user 58 views the scene 62 and concurrently views the generated selection controls. The selection controls may be visually anchored to the objects 38 and 40, such that it is apparent that one selection control is associated with the object 38 and that one selection control is associated with the object 40. If the user 58 moves the camera 52, the selection controls may stay visually anchored to the corresponding objects 38 and 40.

Assume that the user 58 selects the selection control associated with the object 40. The controller 60 accesses the AR metadata record 66-3 to obtain the unique ID 74. The controller 60 sends the unique ID 74 to the computing device 12. The computing device 12 accesses the device record 30-1 and the network information record 70-1 and sends the information from the device record 30-1 and the network information record 70-1 to the controller 60. In this example, for a media streaming device such as the object 40, the network information record 70-1 may include a connection status, information identifying a wireless access point to which the object 40 is connected, a network utilization of the object 40, a current downstream utilization of the object 40, a current upstream utilization of the object 40, a status of the object 40, an initial time and date when the object 40 connected to the network 43, a current activity of the object 40, a MAC address of the object 40, and an operating system of the of the object 40.

The controller 60 generates information imagery that depicts the information. The controller 60 determines a location of the object 40 in the real time video stream generated by the camera 52, and overlays the information imagery on top of a portion of the real time video stream at a location in proximity to the location of the object 40 in the real time video stream to form a composite real time video stream, and sends the composite real time video stream to the display device 54. Where the computing device 46 comprises an optical see-through AR device, the controller 60 projects the information onto a reflective interior surface of the display device 54.

In some embodiments, the computing device 12 may send the MLM 26-1 to the computing device 46. The computing device 12 stores the MLM 26-1 in the storage device 56. In such embodiments, the controller 60 need not provide the image to the computing device 12, the controller 60 presents the image to the MLM 26-1 in the storage device 56 to determine whether an object depicted in an image is a network-attached device. If so, the MLM 26-1 responds with the unique ID of the network attached device. The controller 60 then sends the unique ID to the computing device 12 to obtain the information, such as the network information record 70-1 and the device record 30-1. In some embodiments, the controller 60 may make a determination about the capabilities of the computing device 46 and decide whether to request a copy of the MLM 26-1 based on the capabilities of the computing device 46, such as the power of the processor device 48, the size of the memory 50, and/or the size of the storage device 56. If the controller 60 determines that the capabilities of the computing device 46 are sufficient, the controller 60 requests the MLM 26-1 from the computing device 12. Otherwise, the controller 60 sends the images to the computing device 12 for presentation to the MLM 26-1.

It is noted that, because the controller 60 is a component of the computing device 46, functionality implemented by the controller 60 may be attributed to the computing device 46 generally. Moreover, in examples where the controller 60 comprises software instructions that program the processor device 48 to carry out functionality discussed herein, functionality implemented by the controller 60 may be attributed herein to the processor device 48.

Figure 2:
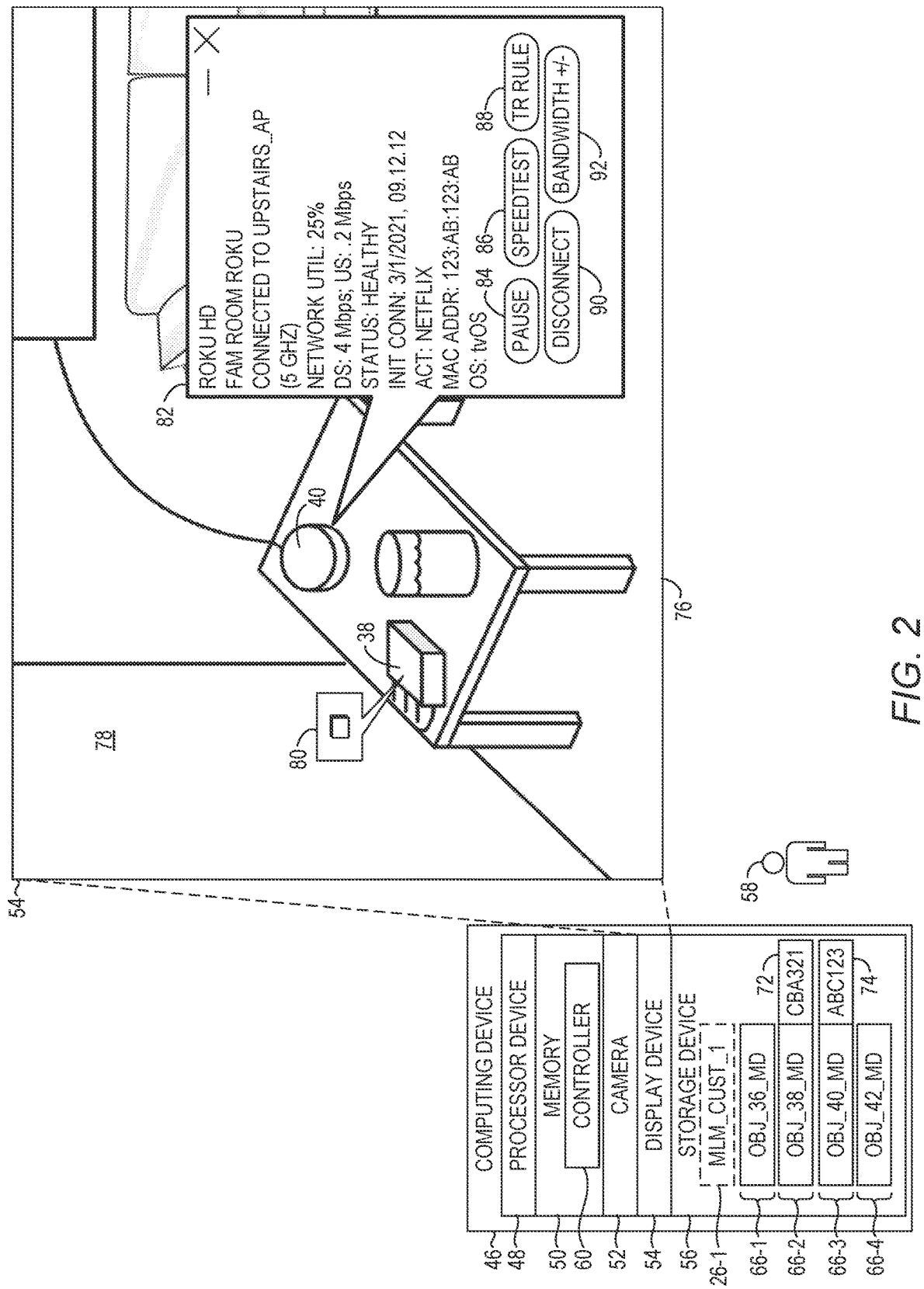
FIG. 2 is a block diagram illustrating example augmented reality imagery that may be presented on a display device according to one embodiment.

FIG. 2 is a block diagram illustrating example imagery 76 that may be presented on the display device 54 according to one embodiment. The imagery 76 includes real time imagery 78 of the scene 62, and AR overlay imagery 80 and 82. The AR overlay imagery 80 is visually anchored to the object 38 and is a selection control that, if selected by the user 58, causes the presentation of information about the object 38. The AR overlay imagery 82 is visually anchored to the object 40 and depicts information about the object 40 obtained from the computing device 12, as discussed with reference to FIG. 1. In this embodiment, the controller 60 also generated user interface (UI) controls 84-92. If the user 58 selects the UI control 84, the controller 60 sends a message to the object 38 (wireless gateway), the object 40, or the computing device 12 that causes the object 40 to pause, and no longer receive or send data.

If the user 58 selects the UI control 86, the controller 60 causes a speed test to be executed that measures the download speed and upload speed of the object 40. The controller 60 may then generate additional AR imagery that depicts the results of the speed test and present the results on the display device 54. If the user 58 selects the UI control 88, the controller 60 retrieves, from the object 38 or the computing device 12, traffic restriction rules and presents the traffic restriction rules on the display device 54 for subsequent selection by the user 58. Such traffic restriction rules may, for example, limit the types of content that may be streamed by the object 40, limit the times of streaming content, limit a total amount of time of streaming content, or the like. Upon selection by the user 58, the controller 60 causes the traffic restriction rule to be implemented by sending an appropriate message to the object 38 and/or computing device 12.

If the user 58 selects the UI control 90, the controller 60 sends a message to the object 38 to disconnect the object 40 from the network 43. If the user 58 selects the UI control 92, the controller 60 sends a message to the object 38 to increase or decrease an amount of bandwidth that is available to the object 40.

The user 58 may select the AR overlay imagery 80 to cause the controller 60 to obtain information about the object 38 from the computing device 12, generate AR imagery that includes the information and concurrently present the information with the real time imagery 78 and the AR overlay imagery 82.

Figure 3:
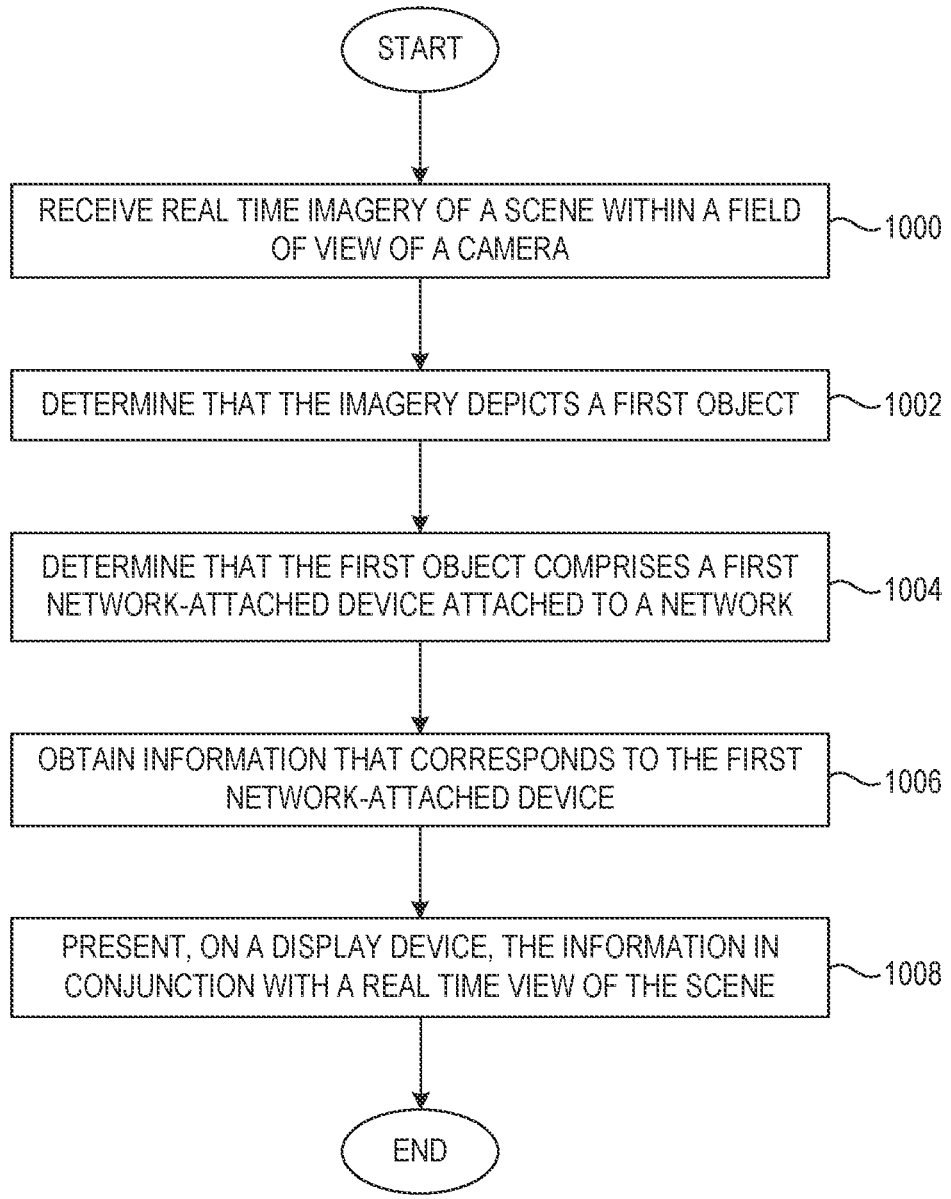
FIG. 3 is a flowchart of a method for automatic network device identification and presentation of network information via augmented reality according to one embodiment.

FIG. 3 is a flowchart of a method for automatic network device identification and presentation of network information via augmented reality according to one embodiment. FIG. 3 will be discussed in conjunction with FIGS. 1 and 2. The computing device 46 receives real time imagery of the scene 62 within the FOV of the camera 52 (FIG. 3, block 1000). The computing device 46 determines that the imagery depicts the object 40 (FIG. 3, block 1002). The computing device 46 determines that the object 40 comprises a network-attached device attached to the network 43 (FIG. 3, block 1004). The computing device 46 obtains information that corresponds to the network-attached device and presents, on the display device 54, the information in conjunction with a real time view of the scene 62 (FIG. 3, blocks 1006-1008).

Figure 4:
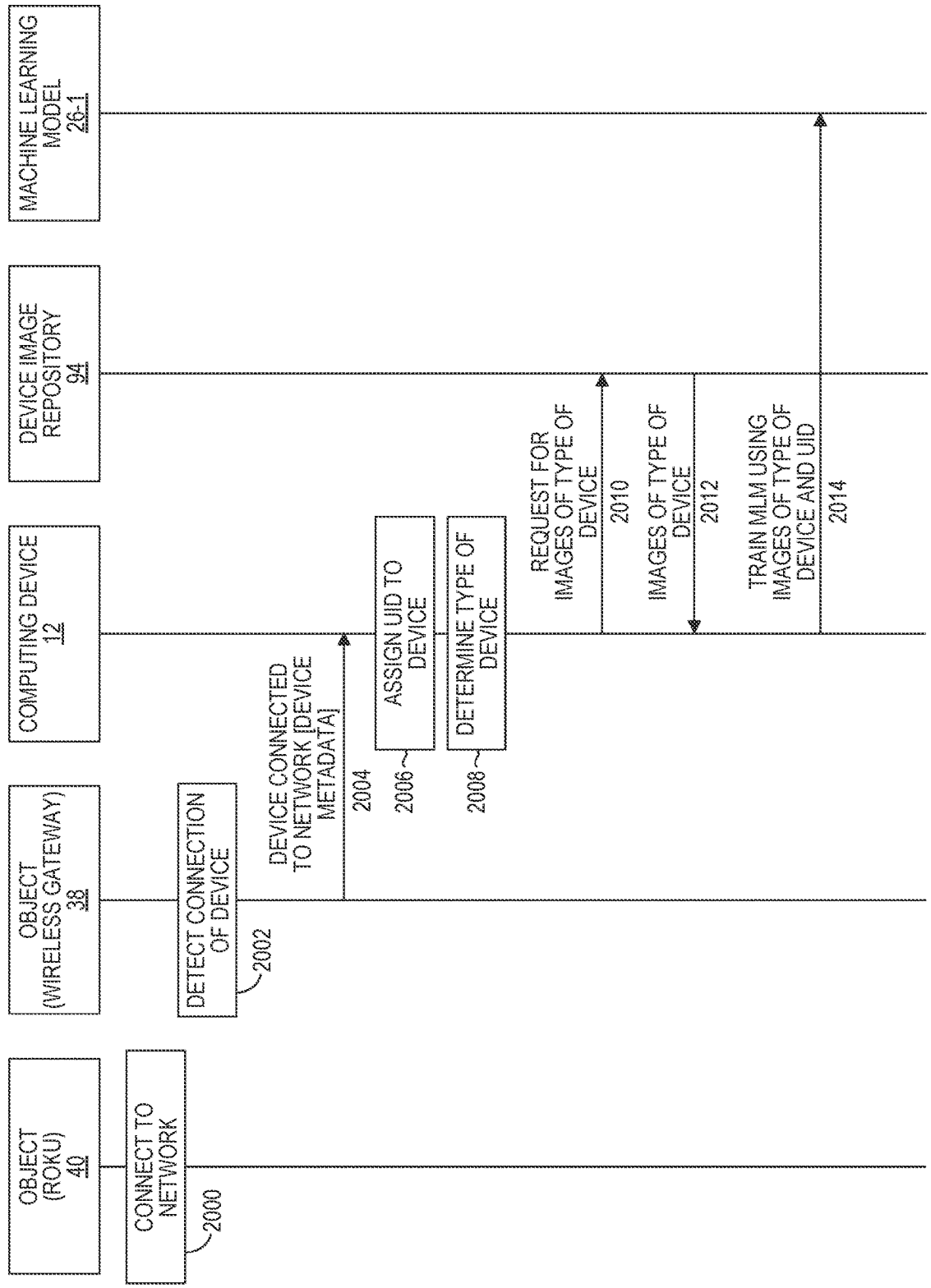
FIG. 4 is a message sequence diagram illustrating messages communicated between and actions taken by various components to train a machine learning model to facilitate automatic network device identification and presentation of network information via augmented reality according to one embodiment.

FIG. 4 is a message sequence diagram illustrating messages communicated between and actions taken by various components to train the MLM 26-1 to facilitate automatic network device identification and presentation of network information via augmented reality according to one embodiment. At a point in time, the object 40 (Roku) is first connected to the network 43 (step 2000). The object 38 (wireless gateway) detects the connection of the object 40 (step 2002). The object 38 is configured to, upon detection of a device connecting to the network 43, send a notification of the connection and metadata relating to the device to a computing device, in this example to the computing device 12 (step 2004). The metadata may include information that identifies the object 38 as a particular type of device.

The computing device 12 receives the notification and device metadata and assigns a unique ID to the object 40 (step 2006). The computing device 12 determines the type of device of the object 40 (step 2008). The determination of the device may be based on network traffic generated by the device, such as, by way of non-limiting example, multicast DNS (MDNS), dynamic host configuration protocol (DHCP), domain name service (DNS), hypertext transfer protocol (HTTP(s)) and session description protocol (SDP) traffic. In some embodiments, a device identification package such as Cujo AI Explorer (cujo.com) that utilizes artificial intelligence and machine learning may be used to identify the type of device of the object 40. The computing device 12 sends a request to a device image repository 94 for images of the device type (step 2010). The device image repository 94 may be one or more private and/or public image repositories, such as, by way of non-limiting example, a Google image repository, a Bing image repository, and/or a proprietary image repository generated by the entity 18 based on the most common types of devices that connect to a customer's network.

The computing device 12 receives images of the type of device of the object 40 from the device image repository 94 (step 2012). The computing device 12 trains the MLM 26-1 using the images and the assigned unique ID such that when the MLM 26-1 is presented with an image that depicts the object 40, the MLM 26-1 returns the unique ID of the object 40, or some other information via which the unique ID of the object 40 can be determined (step 2014). Once the MLM 26-1 is trained to a sufficient accuracy level, the MLM 26-1 can be placed into operation. In some embodiments, the MLM 26-1 may be sent to the computing device 46 for use in identifying an object locally. In other embodiments, the MLM 26-1 is stored in the storage device 24 and used by the computing device 12 to identify an object upon receipt of an image from the computing device 46. This training process may be repeated each time a device first connects to the network 43 such that, over time, the MLM 26-1 is trained to identify a plurality of different devices connected to the network 43.

While solely for purposes of illustration and simplicity the computing device 12 has been illustrated as accessing the MLM 26-1 to determine whether an object depicted in an image is a network-attached device, maintaining real time network statistics for network-attached devices, and training the MLM 26-1, in operation such functionality may be implemented by a plurality of different computing devices each of which includes one or more processor devices. The one or more computing devices collectively form a processor device set. Thus, in some embodiments, the functionality described herein may be implemented by a computer system comprising a processor device set of one or more computing devices.

Figure 5:
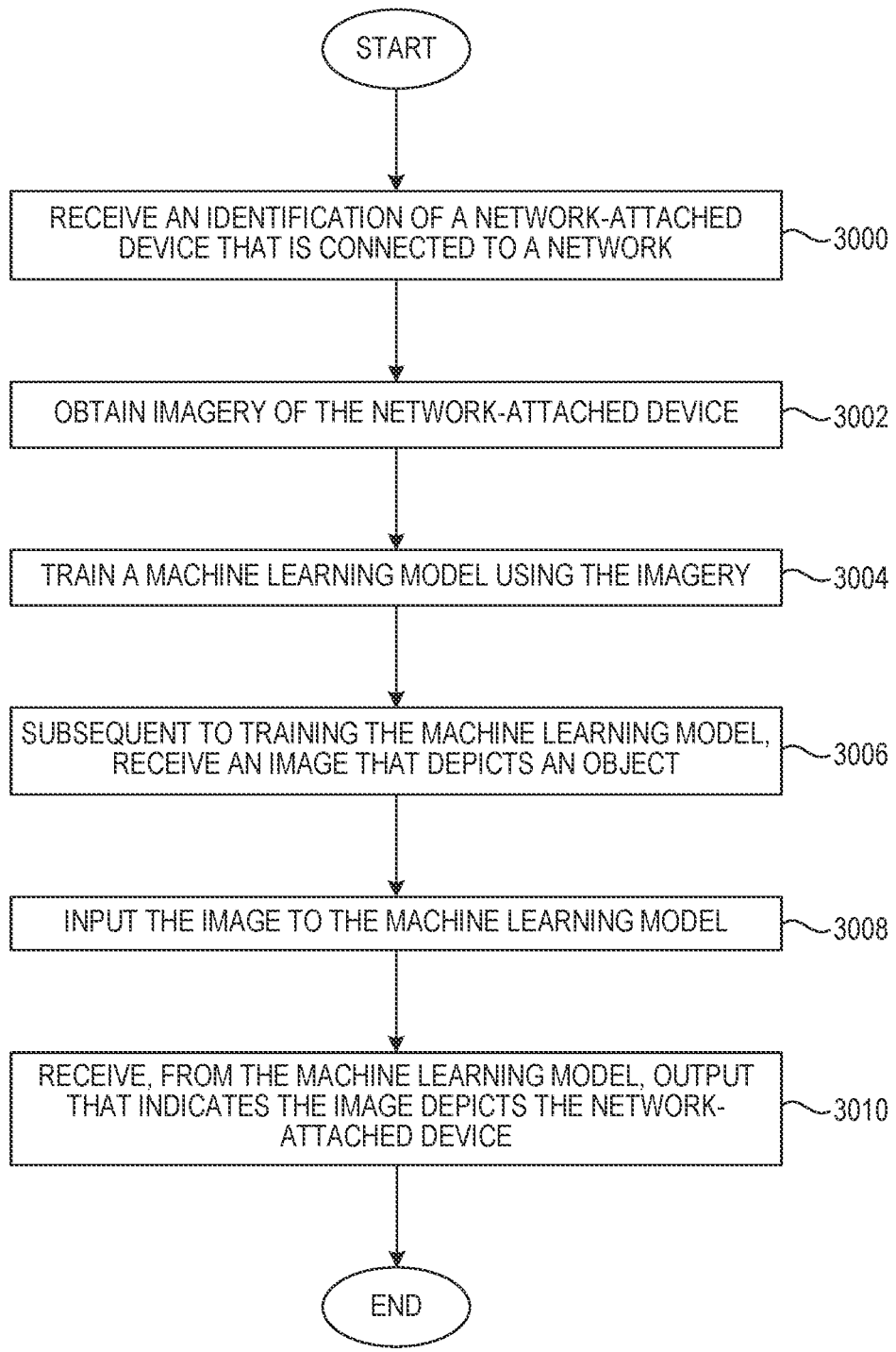
FIG. 5 is a flowchart of a method for training and utilizing a machine learning model for use in automatic network device identification and presentation of network information via augmented reality according to one embodiment.

FIG. 5 is a flowchart of a method for training and utilizing a machine learning model for use in automatic network device identification and presentation of network information via augmented reality according to one embodiment. FIG. 5 will be discussed in conjunction with FIG. 4. A computer system comprising a processor device set of one or more computing devices receives an identification of a network-attached device (e.g., the object 40) that is connected to the network 43 (FIG. 5, block 3000). The computer system obtains imagery of the network-attached device (FIG. 5, block 3002). The computer system trains the machine learning model 26-1 using the imagery (FIG. 5, block 3004). The computer system subsequently receives an image that depicts the object 40 (FIG. 5, block 3006). The computer system inputs the image to the machine learning model 26-1 (FIG. 5, block 3008). The computer system receives, from the machine learning model 26-1, output that indicates that the image depicts the network-attached device (FIG. 5, block 3010).

Figure 6:
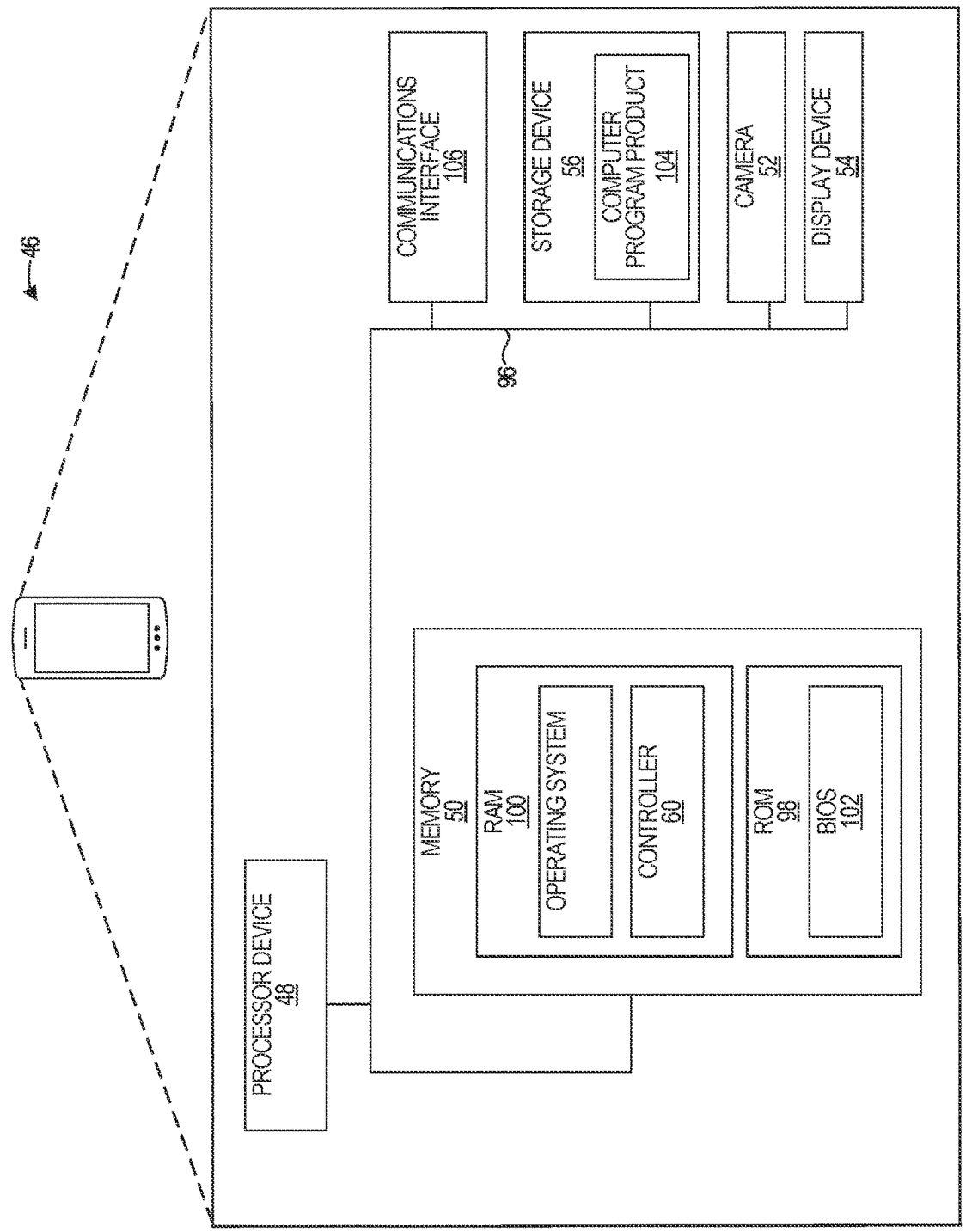
FIG. 6 is a block diagram of a computing device suitable for implementing embodiments disclosed herein.

FIG. 6 is a block diagram of the computing device 46 suitable for implementing examples according to one example. The computing device 46 may comprise any computing or electronic device capable of including firmware, hardware, and/or executing software instructions to implement the augmented reality functionality described herein, such as a smart phone, a computing tablet, a laptop computer, an optical see-through AR device, a video see-through AR device, or the like. The computing device 46 includes the processor device 48, the system memory 50, and a system bus 96. The system bus 96 provides an interface for system components including, but not limited to, the system memory 50 and the processor device 48. The processor device 48 can be any commercially available or proprietary processor.

The system bus 96 may be any of several types of bus structures that may further interconnect to a memory bus (with or without a memory controller), a peripheral bus, and/or a local bus using any of a variety of commercially available bus architectures. The system memory 50 may include non-volatile memory 98 (e.g., read-only memory (ROM), erasable programmable read-only memory (EPROM), electrically erasable programmable read-only memory (EEPROM), etc.), and volatile memory 100 (e.g., random-access memory (RAM)). A basic input/output system (BIOS) 102 may be stored in the non-volatile memory 98 and can include the basic routines that help to transfer information between elements within the computing device 46. The volatile memory 100 may also include a high-speed RAM, such as static RAM, for caching data.

The computing device 46 may further include or be coupled to a non-transitory computer-readable storage medium such as the storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 56 and in the volatile memory 100, including an operating system and one or more program modules, such as the controller 60, which may implement the functionality described herein in whole or in part. All or a portion of the examples may be implemented as a computer program product 104 stored on a transitory or non-transitory computer-usable or computer-readable storage medium, such as the storage device 56, which includes complex programming instructions, such as complex computer-readable program code, to cause the processor device 48 to carry out the steps described herein. Thus, the computer-readable program code can comprise software instructions for implementing the functionality of the examples described herein when executed on the processor device 48. The processor device 48, in conjunction with the controller 60 in the volatile memory 100, may serve as a controller, or control system, for the computing device 46 that is to implement the functionality described herein.

An operator, such as the user 58, may also be able to enter one or more configuration commands through a keyboard (not illustrated), a pointing device such as a mouse (not illustrated), one or more buttons, or a touch-sensitive surface such as the display device 54. The computing device 46 may also include a communications interface 106 suitable for communicating with the network 43 as appropriate or desired.

The computing device 46 also includes the camera 52, which may comprise one or more cameras capable of generating real time imagery of a scene at a desired resolution. The computing device 46 also includes the display device 54, which, as discussed above, may comprise a LCD, OLED, or the like panel, or may comprise a partially transmissive and partially reflective lens or mirror.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing system comprising one or more computing devices, from a first computing device coupled to a first network of a first entity, information identifying a second computing device that has connected to the first network, the information identifying a first device type of the second computing device;
   assigning, by the computing system, a first unique identifier (ID) to the second computing device;
   obtaining, by the computing system, first imagery from an image repository that contains images of computing devices of different device types, the first imagery depicting a computing device of the first device type;
   using, by the computing system, the first imagery to train a first machine learning model (MLM) to output the first unique ID when presented with an image that depicts a computing device of the first device type; and
   storing, by the computing system, information that associates the first MLM with the first network.

2. The method of claim 1 further comprising:
   subsequent to training the first MLM, receiving, by the computing system from an augmented reality device connected to the first network, a first image depicting the second computing device;
   determining, by the computing system, that the first image is associated with the first network;
   selecting, by the computing system, the first MLM from a plurality of MLMs, each MLM being associated with a different network;
   inputting, by the computing system, the first image to the first MLM; and
   receiving, by the computing system, output from the first MLM that comprises the first unique ID.

3. The method of claim 2 further comprising:
   in response to receiving the first unique ID, retrieving, by the computing system, information that corresponds to the second computing device; and
   sending the information that corresponds to the second computing device to the augmented reality device.

4. The method of claim 3 wherein the information that corresponds to the second computing device identifies one or more of: a Wi-Fi® access point to which the second computing device is connected, a network utilization of the second computing device, a connectivity status of the second computing device, a device type of the second computing device, a media access control (MAC) address of the second computing device, an internet protocol (IP) address of the second computing device, and a current activity of the second computing device.

5. The method of claim 3 wherein the information that corresponds to the second computing device comprises a name of the second computing device.

6. The method of claim 2 further comprising:
   receiving, by the computing system from the augmented reality device connected to the first network, an image depicting an object;
   determining, by the computing system, that the image depicting the object is associated with the first network;
   selecting, by the computing system, the first MLM from the plurality of MLMs;
   inputting, by the computing system, the image depicting the object to the first MLM;
   receiving, by the computing system, output from the first MLM that indicates that the first MLM does not recognize the object; and
   sending, by the computing system to the augmented reality device, information indicating that the object is not connected to the first network.

7. The method of claim 1 further comprising sending, by the computing system to an augmented reality device connected to the first network, the first MLM.

8. The method of claim 1 further comprising:
   receiving, by the computing system from the first computing device, information identifying a third computing device that has connected to the first network, wherein the information identifying a third computing device identifies a second device type of the third computing device;
assigning, by the computing system, a second unique ID to the third computing device;
obtaining, by the computing system, second imagery from the image repository, the second imagery depicting a computing device of the second device type; and
using, by the computing system, the second imagery to train the first MLM to output the second unique ID when presented with an image that depicts a computing device of the second device type.

9. The method of claim 8 further comprising:
receiving, by the computing system from the augmented reality device, a first image depicting the third computing device;
determining, by the computing system, that the first image is associated with the first network;
selecting, by the computing system, the first MLM from the plurality of MLMs;
inputting, by the computing system, the first image to the first MLM; and
receiving, by the computing system, output from the first MLM that comprises the second unique ID.

10. The method of claim 9 further comprising:
sending, by the computing system to the augmented reality device, the second unique ID.

11. The method of claim 1 wherein the second computing device comprises one of a media streaming device, a security camera, a smart speaker, and a game console.

12. The method of claim 1 further comprising:
receiving, by the computing system, from a third computing device coupled to a second network of a second entity, information identifying a fourth computing device that has connected to the second network, wherein the information identifying a fourth computing device identifies a second device type of the fourth computing device;
assigning, by the computing system, a second unique ID to the fourth computing device;
obtaining, by the computing system, second imagery from the image repository, the second imagery depicting a computing device of the second device type;
using, by the computing system, the second imagery to train a second MLM to output the second unique ID when presented with an image that depicts a computing device of the second device type; and
storing, by the computing system, information that associates the second MLM with the second network.

13. The method of claim 12 further comprising:
subsequent to training the second MLM, receiving, by the computing system from an augmented reality device connected to the second network, a second image depicting the fourth computing device;
determining, by the computing system, that the second image is associated with the second network;
selecting, by the computing system, the second MLM from the plurality of MLMs;
inputting, by the computing system, the second image to the second MLM; and
receiving, by the computing system, output from the second MLM that comprises the second unique ID.

14. The method of claim 13 further comprising sending, by the computing system to the augmented reality device connected to the second network, the second unique ID.

15. A computing system comprising:
one or more computing devices operable to:
receive, from a first computing device coupled to a first network of a first entity, information identifying a second computing device that has connected to the first network, the information identifying a first device type of the second computing device;
assign a first unique identifier (ID) to the second computing device;
obtain first imagery from an image repository that contains images of computing devices of different device types, the first imagery depicting a computing device of the first device type;
use the first imagery to train a first machine learning model (MLM) to output the first unique ID when presented with an image that depicts a computing device of the first device type; and
store information that associates the first MLM with the first network.

16. The computing system of claim 15 wherein the one or more computing devices are further operable to:
subsequent to training the first MLM, receive, from an augmented reality device connected to the first network, a first image depicting the second computing device;
determine that the first image is associated with the first network;
select the first MLM from a plurality of MLMs, each MLM being associated with a different network;
input the first image to the first MLM; and
receive output from the first MLM that comprises the first unique ID.

17. The computing system of claim 16 wherein the one or more computing devices are further operable to:
receive, from an augmented reality device connected to the first network, an image depicting an object;
determine that the image depicting the object is associated with the first network;
select the first MLM from the plurality of MLMs;
input the image depicting the object to the first MLM;
receive output from the first MLM that indicates that the first MLM does not recognize the object; and
send, to the augmented reality device, information indicating that the object is not connected to the first network.

18. The computing system of claim 15 wherein the one or more computing devices are further operable to:
receive, from the first computing device, information identifying a third computing device that has connected to the first network, the information identifying a second device type of the third computing device;
assign a second unique ID to the third computing device;
obtain, second imagery from the image repository, the second imagery depicting a computing device of the second device type; and
use the second imagery to train the first MLM to output the second unique ID when presented with an image that depicts a computing device of the second device type.

19. The computing system of claim 15 wherein the one or more computing devices are further operable to:
receive, from a third computing device coupled to a second network of a second entity, information identifying a fourth computing device that has connected to the second network, wherein the information identifying the fourth computing device identifies a second device type of the fourth computing device;
assign a second unique ID to the fourth computing device;

obtain second imagery from the image repository, the second imagery depicting a computing device of the second device type;

use the second imagery to train a second MLM to output the second unique ID when presented with an image that depicts a computing device of the second device type; and store information that associates the second MLM with the second network.

20. A non-transitory computer-readable storage medium that includes executable instructions configured to cause one or more computing devices to:

receive, from a first computing device coupled to a first network of a first entity, information identifying a second computing device that has connected to the first network, the information identifying a first device type of the second computing device;

assign a first unique identifier (ID) to the second computing device;

obtain first imagery from an image repository that contains images of computing devices of different device types, the first imagery depicting a computing device of the first device type;

use the first imagery to train a first machine learning model (MLM) to output the first unique ID when presented with an image that depicts a computing device of the first device type; and store information that associates the first MLM with the first network.

* * * * *